July 12, 1955 F. CICERO 2,712,946
AUTO-LEVELING AND STABILIZING FRAME
FOR VEHICLES AND PLATFORMS
Filed April 26, 1950
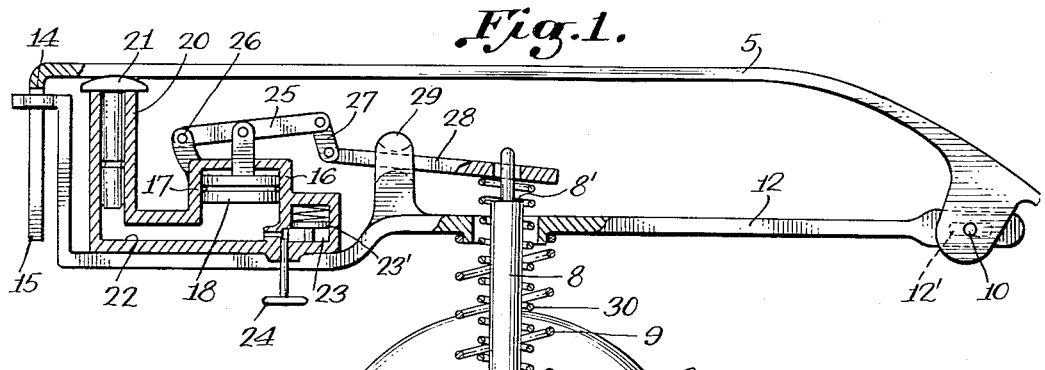
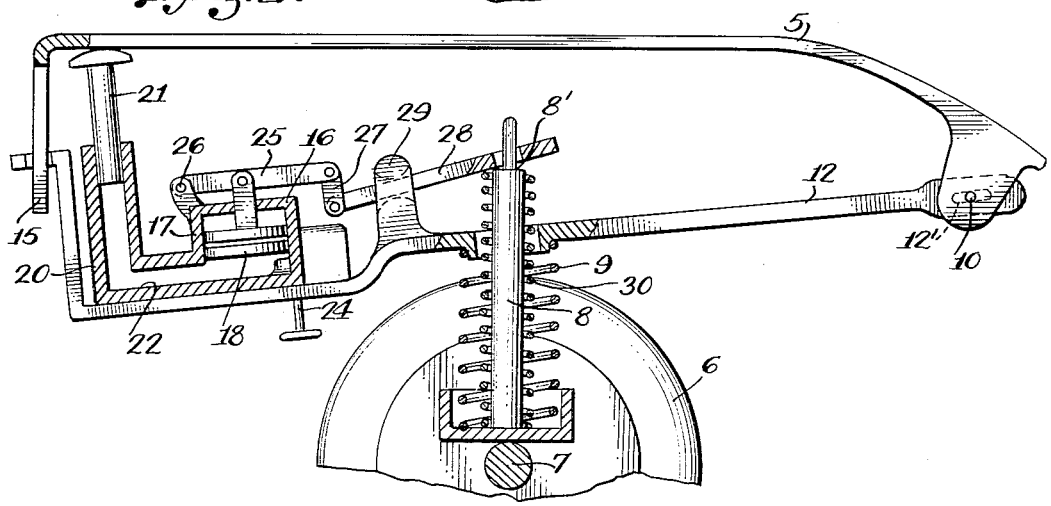
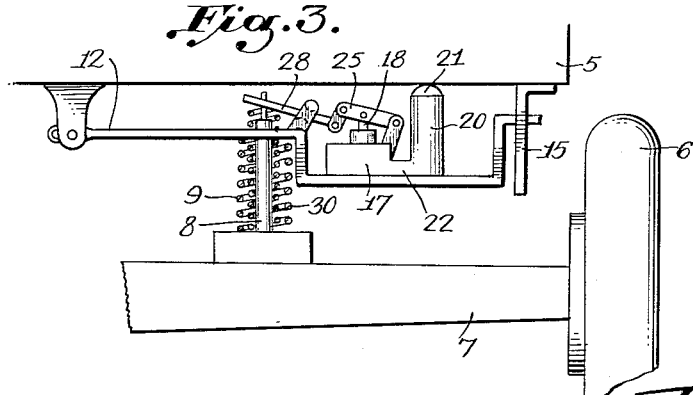
INVENTOR
FRANK CICERO.
Frank Cicero

United States Patent Office 2,712,946
Patented July 12, 1955

2,712,946

AUTO-LEVELING AND STABILIZING FRAME FOR VEHICLES AND PLATFORMS

Frank Cicero, Los Angeles, Calif.

Application April 26, 1950, Serial No. 158,111

8 Claims. (Cl. 280—124)

My invention relates to stationary and mobile supports and more particularly to a self-leveling and stabilizing mechanism by which a platform or vehicle chassis or vehicle frame is maintained in a substantially level position. Specifically, the invention is concerned with a mechanism of the character referred to which is operative to react against uneven loads imposed upon a platform or the like, against shock loads imposed upon the chassis or suspension means of a vehicle, or uneven shifting of loads thereon, due to uneven roadways fields or railways along which the vehicle may travel.

One object of my invention is to provide a mechanism of the class referred to which, when employed in connection with a vehicle, serves to facilitate driving and make it more enjoyable and safe by leveling and stabilizing the vehicle following sharp turns and swerving on the highway. By use of this mechanism, sharp turns, driving on roads having sloping sides, and driving on uneven fields can be made at a faster rate with less strain on the vehicle structure and driver, with less tendency of forcing the driver or passengers from their seats and with far less danger of overturning the vehicle. When driving uphill, or when the vehicle is overloaded at the rear end, my improved mechanism functions to prevent the rear end of the chassis to be lowered substantially in respect to the road's surface or the vehicle's axles so as to reduce drag and effect a more even load distribution and, consequently, more efficient and economical operation of the vehicle. Further, when the brakes are applied suddenly right behind a stopped vehicle, the mechanism prevents the front end of the vehicle to lower considerably and therefore reduces or eliminates the tedious hazard of hooking up bumpers. Additionally, it is an object to provide a leveling and stabilizing mechanism which finds utility in connection with various types of platforms used as supports for various objects, the mechanism serving to automatically level the platform to compensate for uneven loading thereon.

Another object is to provide a mechanism of the type referred to which includes a relatively long arm having an end pivoted to the underside of the vehicle frame, this arm being supported above an axle of the vehicle on a suspension spring extending upwardly from the axle, the spring being either of the compression coil type, or of the elliptical or semi-ellipitical types. A pressure fluid pump-jack combination is carried by the arm and has an upstanding jack clinder in which is slidable a jack piston, said cylinder having a port communicating with the lower end of a main pump cylinder in which is slidable a pump piston operative to force fluid from the pump cylinder into the jack cylinder the displacement of the former being suitably greater than the volume of the latter. In accordance with my invention, the frame or chassis of the vehicle rests directly upon the upper end of the jack piston which, in turn, normally rests upon the upper end of the jack cylinder. An operating lever of a system of levers is pivotally connected to the arm with its free end resting upon the upper end of a second spring projecting upwardly from the axle. An operating rod surrounded by said second spring projects upwardly from the axle through a hole in the arm, the upper end of said rod being reduced to extend through an aperture in the operating lever and to provide a shoulder suitably below said aperture. By this construction and arrangement of elements, when the chassis and therefore the jack is lowered initially a little due to overloading or downward thrust from any cause, it depresses the arm against the action of the suspension spring. Farther downward movement of the arm causes the operating rod to pivot the operating lever in a direction to effect actuation of the piston of the pump which then functions to force fluid into the jack cylinder to raise the jack piston, thus causing the arm to pivot and compress the suspension spring. Thus, by suspending the four corners of the vehicle frame by such mechanisms, the frame is automatically leveled or stabilized at each excessive loading of any portion of the vehicle, these mechanisms being operable independently of one another, whether or not the vehicle is in motion.

A further object is to provide a leveling and stabilizing mechanism which is very flexible in its application to use, the mechanism being so constructed that its arm may extend either longitudinally or transversely of the vehicle with the free end of the arm located either forwardly or rearwardly of the vehicle axle. Furthermore, the assembly relative to the axle can be located beneath the jack if the pump and operating lever are turned around and the fluid passage is extended.

A further object is to provide means for absorbing slight shocks, this means consisting in the smaller spring mentioned above, together with the vertical clearance between the operating lever and the shoulder on the operating rod to allow limited vertical movement of the operating lever without actuating the pump piston.

Another object is to provide further means for preventing the raising of any of the jack pistons as desired, this means consisting of an expansion or relief chamber in communication with the pump cylinder and into which the fluid is forced during the initial movement of the pump piston, the fluid thus flowing into and from this chamber when the piston is moved.

A still further object is to provide a leveling and stabilizing mechanism which is relatively simple in construction, economical to manufacture and highly efficient in performing its intended function.

Further objects will appear from the following description and from the drawing, which is intended for the purpose of illustration only, and in which:

Fig. 1 is a fragmentary side view of the frame or chassis, the axle and wheel of a vehicle, showing my improved leveling and stabilizing mechanism applied to use therewith, the components assuming their normal operative, non-loaded position;

Fig. 2 is a view similar to Fig. 1, showing the mechanism operative to elevate the jack piston to compensate for a load imposed upon the chassis and to level the latter; and Fig. 3 is a similar view, showing the mechanism arranged with its arm extending substantially parallel to the axle, or transversely to the vehicle.

Referring to the drawing in detail, my mechanism is shown as used in connection with a vehicle having a frame or chassis 5, only a portion of which is illustrated. The vehicle has several wheels, one of which is shown at 6 as rotatable on an axle 7. An operating rod 8 projects upwardly from the axle 7 and surrounding the rod is a suspension coil spring 9, although a leaf spring may be substituted for the coil spring, within the concept of this invention. The upper end of the rod 8 is reduced in diameter, thus providing a shoulder 8'.

Pivotally and slidably connected to the chassis at one side of the axle on a pin 10 is a relatively long arm 12 which extends over the axle at right angles thereto, the free end of the arm extending through a slot 14 in a vertical flange 15 of the chassis, the arm being slotted at its lateral edges where it passes through this slot. The arm 12 has an elongated opening 12' through which the pin 10 extends.

Carried by the arm 12, at the opposite side of the axle from the pivot 10, is a fluid pump 16 which has a cylinder 17 in which is vertically slidable a piston 18 of relatively large diameter. Within a vertical jack cylinder 20 is slidable a jack piston 21. A fluid passage 22 extends from the lower end of the pump cylinder 17 to the lower end of the jack cylinder 20. A relief or expansion chamber 23 has its lower end in fluid communication with the lower end of the cylinder 17, a spring-actuated plunger 23' being slidable in the chamber.

A system of levers is provided for actuating the piston 18, this system including a lever 25 pivoted to the pump housing at 26 and pivotally connected, intermediate its ends, to the upper end of the piston 18. The free end of the lever 25 is connected to one end of a link 27, the other end of the link being pivotally connected to an end of an operating lever 28. The lever 28 passes through a rounded fulcrum hole in a lug 29 formed on the arm 12. The free end of the lever 28 has an aperture through which the upper reduced end of the operating rod 8 extends, the rod also passing upwardly through a hole in the arm 12. The upper end of the suspension spring 9 engages the underside of the arm 12 as shown. A second coil compression spring 30, surrounding the operating rod 8, projects upwardly through the hole in the arm 12 with its upper end engageable to the underside of the operating lever 28, this spring being much lighter than the suspension spring 9. Clearance is provided between the shoulder 8' and the underside of the lever 28 as shown. It is pointed out that one of the mechanisms described above is employed at each corner of the vehicle.

In Figs. 1 and 2, the mechanism is shown as positioned with its arm 12 extending longitudinally of the vehicle, that is, normal to the axis of rotation of the wheel. The mechanism may, however, be mounted as shown in Fig. 3 so that its arm extends parallel to said axis of rotation.

Assuming that the vehicle is carrying a normal load which is substantially uniformly distributed, each corner of the chassis and body will be supported by one of the springs 9 by reason of the fact that the chassis rests upon the upper end of the piston 21, which, in turn, engages the upper end of the jack cylinder 20 fixedly secured to the arm 12, the latter being supported at all times upon the suspension spring 9. Thus, under normal riding conditions, the chassis, together with the arm 12, would merely ride up and down with respect to the axle 7, with the suspension spring yielding to cushion the ride. This condition may prevail only when shock-less road conditions are encountered, when the vehicle is traveling along a level highway and when its load is not shifted. However, when conditions exist which start imposing a load upon a corner of the vehicle frame as, for example, when excessive weight or shock loads occur, the downward load acts through the piston 21 and cylinder 20 to cause the arm 12 to descend against the suspension spring 9. In effect, then, the entire chassis, jack and arm tend to depress the spring 9. However, since the arm 12 descends relative to the axle 7 and yet the rod 8 cannot descend, the shoulder 8' of the rod eventually engages and exerts an upward thrust against the lever 28 to cause pivotal movement of the latter in a direction to force the piston 18 downwardly in the cylinder 17. This action of the piston 18 pumps fluid through the passage 22 so as to force the piston 21 upwardly; consequently, as the arm 12 descends and the spring 9 shortens due to the load, said corner of frame 5 is kept approximately at the normal level by the gradual extending up of the piston 21 concurrent to the descending of the arm, due to the fluid pressure brought by way of the pump lever. In effect, then, the downward thrust of the chassis 5, the action of the jack piston 21, and the downward movement of the jack cylinder 20 and arm 12, tend to depress the suspension spring 9.

Thus, the chassis and arm are relatively pivoted away from each other, the increment of upward movement of the jack piston 21 being proportional to the downward movement of the arm 12 as controlled by the strength of the spring 9. The force necessary to effect such lifting of the chassis is readily achieved by properly proportioning the cross-sectional areas of the cylinders 17 and 20 to produce the displacement necessary to provide the fluid pressure necessary to elevate the piston 21 and chassis.

It will be understood that one of the leveling mechanisms is arranged at each corner of the vehicle, each being operable independently of the others to level the particular corner to compensate for loads tending to lower this corner. In the case of a load or force imposed momentarily upon the chassis or a portion thereof, as the load is relieved and the arm 12 thus is raised by the spring 9, the lever 25 returns to the inoperative position due to the pressure existing in the jack and pump cylinders as long as the jack piston and the chassis descend. The mechanisms thus function to level the corners to compensate for loads imposed upon the chassis due to increased weight, shifting of weight, shock loads or forces which may occur during travel of the vehicle along uneven roads. When the vehicle is traveling uphill, the leveling mechanisms at the rear operate in the manner explained above to prevent the rear end of the chassis to lower considerably in relation to the axles so as to compensate for such inclination and maintain the chassis and body of the vehicle in a more nearly level plane. Conversely, when the vehicle travels downhill, the leveling means at the front end act automatically to establish a more nearly level condition.

By providing the separate spring 30 and the clearance between the shoulder 8' on the rod and the underside of the lever 28, the suspension means is adapted to move upwardly and downwardly as a unit without causing actuation of the jack piston 21, when the vehicle is subjected to slight jolts which occur during normal travel along a highway.

As it is apparent, the shoulder 8' of the rod may be omitted entirely because the spring 30 may be also adaptable to push upwardly the lever 28 when the latter is forced considerably downwardly on said spring.

In the case of racing cars, it is desirable that action of the leveling mechanisms which are located at the side of the car traveling at the inside of the track curves be rendered ineffectual so as to prevent unnecessary tilting of the car toward the outside of the curve. The expansion chambers 23 of the mechanisms provide the means for rendering these mechanisms inoperative. A valve 24 between the pump cylinder and the chamber and operative from the instrument panel or otherwise, may be opened as the car approaches a curve to allow the fluid to be forced into the chamber instead of into the jack cylinder. After passing the curve, the spring-actuated plunger in the chamber forces the fluid back into the pump cylinder, provided the valve is maintained open.

In the case of a movable, or immovable platform, the mechanisms function as in the case of the vehicle frame to compensate for uneven distribution of load on the platform.

While I have herein shown my automatic leveling and stabilizing means as embodied in a form of construction, by way of example, it will be apparent that modifications might be made in the structure without departing from the spirit of the invention. Consequently, I do not wish to be limited in this respect but desire to be afforded the full scope of the appended claims.

I claim as my invention:

1. A leveling means for use in connection with a chassis or like support, comprising: an upstanding rod and a suspension spring; a substantially horizontal arm pivoted on the chassis and having a hole through which the rod is slidable, said arm resting upon said spring; a fluid actuated jack carried by said arm; a pump for actuating the jack, said jack being in fluid communication with said pump and having a vertically slidable piston, said chassis resting upon the upper end of the jack piston so that the chassis, jack and arm are supported by said spring; and an operating lever assemblage engageable by the upper end of said rod and adaptable to actuate said pump to raise said piston to pivot away from said chassis said arm when the latter is lowered on said rod and compresses said spring.

2. A leveling means for use in connection with a chassis or like support, comprising: an upstanding rod and a suspension spring; a substantially horizontal arm pivoted to the chassis and having a hole through which the rod is slidable, said arm resting upon said spring; a fluid-actuated jack cylinder mounted on the arm and having a vertically slidable piston; a pump for actuating the jack and including a pump cylinder and a pump piston slidable in the cylinder, said jack cylinder being in fluid communication with said pump cylinder, the latter having a greater displacement than the volume of the former, said chassis resting upon said jack piston so that the chassis, jack and arm are supported by the spring; and a system of levers having an operating lever engageable by the upper end of said rod to actuate said pump to raise said jack piston to pivot away from said chassis said arm when the latter is lowered on said rod and compresses said spring.

3. A leveling means for use in connection with a chassis or like support, comprising: an upstanding rod and a suspension spring; a substantially horizontal arm pivoted to said chassis and having a hole through which the rod is slidable, said arm resting upon said spring; a fluid-actuated jack mounted on the arm and having a cylinder and a piston slidable vertically therein; a pump cylinder and a piston slidable therein, said jack cylinder being in fluid communication with said pump cylinder, said chassis resting upon said jack piston and the latter engaging the top of the jack cylinder so that the chassis, jack and arm are supported by the suspension spring; and a system of levers operative to actuate said pump piston to raise said jack piston to pivot away from said chassis said arm when the latter is lowered on said rod and compresses said spring, said system of levers including a lever pivoted to said pump and said pump piston, a link connected at one end to said lever, and an operating lever pivoted to said arm and having one of its ends pivotally connected to said link and the other of its ends operatively connected to the upper end of said rod.

4. A leveling means for use in connection with a chassis or like support, comprising: an upstanding rod; a suspension spring; a substantially horizontal arm pivoted on said chassis and having a hole through which the rod is slidable, said arm resting upon said spring; a fluid-actuated jack mounted on the arm and including a cylinder and a jack piston slidable in said cylinder; a pump cylinder in fluid communication with said jack cylinder and a pump piston slidable in said pump cylinder, said chassis resting upon said jack piston and the latter resting upon the top of said jack cylinder so that the chassis, jack and arm are supported by the suspension spring; and a system of levers operatively connected to the upper end of said rod and operative to actuate said pump piston to raise said jack piston to pivot away from said chassis said arm when the latter is lowered on said rod and compresses said spring, said system of levers including a pivoted lever connected to said pump piston, a link connected at one end to said lever, and an operating lever pivoted to said arm and having one of its ends pivotally connected to said link and the other of its ends adapted to be engaged by the upper portion of said rod, said operating lever extending through a hole in a fulcrum lug on said arm to adapt it for pivotal movement thereon.

5. In combination with a chassis or like support: a plurality of upstanding operating rods beneath the chassis; a plurality of suspension springs beneath the chassis; and a plurality of leveling means for the chassis, each including a substantially horizontal arm pivoted on the chassis and having a hole through which one of said rods is slidable, said arm resting upon said spring; a fluid-actuated jack carried by the arm and including a jack cylinder and a jack piston slidable in said cylinder, and said chassis resting upon the upper end of said piston so that the chassis, jack and arm are supported by the spring; and a system of levers including an operating lever engageable by the upper end of said rod and operative to actuate said pump to raise said piston to pivot away from said chassis said arm when the latter is lowered on said rod and compresses said suspension spring, each leveling means being operable independently of the other leveling means and all of said leveling means cooperating to maintain the chassis or like support substantially level.

6. A vehicle, comprising: a chassis; an axle below the chassis; a wheel rotatable on said axle; a vertical rod extending upwardly from the axle and having an upper reduced end providing a shoulder; a suspension spring extending upwardly around the rod; a substantially horizontal arm pivoted on said chassis and having a hole through which the rod is slidable, said arm resting upon said spring; a fluid-actuated jack carried by the arm and including a vertical piston; a pump for operating said jack piston, said chassis resting upon said piston so that the chassis, jack and arm are supported upon said spring; a system of levers operative to actuate said pump to raise said piston to pivot away from said chassis said arm when the latter is lowered on said rod and compresses said suspension spring, said system including an operating lever pivoted on said arm and having an aperture through which said reduced end of said rod extends with said shoulder disposed below said operating lever; and a coil spring extending upwardly from said axle within said suspension spring with its upper end engageable to said operating lever, said coil spring being of less strength than said suspension spring.

7. A vehicle as defined in claim 4, including means defining an expansion chamber in fluid communication with said pump cylinder; a spring-actuated plunger in said chamber; and a valve between said pump cylinder and said chamber by which flow of fluid from said pump cylinder to said chamber can be established as desired.

8. A vehicle, comprising: a chassis; an axle below the chassis; a wheel rotatable on said axle; a vertical rod extending upwardly from the axle; a suspension spring extending upwardly around the rod; a substantially horizontal arm pivoted on said chassis and having a hole through which the rod is slidable, said arm resting upon said spring; a fluid-actuated jack carried by the arm and including a vertical piston; a pump for operating said jack piston, said chassis resting upon said piston so that the chassis, jack and arm are supported upon said spring; a system of levers operative to actuate said pump to raise said piston to pivot away from said chassis said arm when the latter is lowered on said rod and compresses said suspension spring, said system including an operating lever pivoted on said arm and having an aperture through which said rod extends; and a coil spring extending upwardly from said axle within said suspension spring and having its upper end abutting against said operating lever.

References Cited in the file of this patent

UNITED STATES PATENTS

| 2,128,273 | Stevens | Aug. 30, 1938 |
| 2,268,017 | Busick, Jr. et al. | Dec. 30, 1941 |
| 2,324,587 | Krogh | July 20, 1943 |